Figure 3:
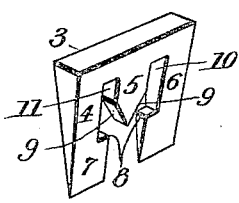

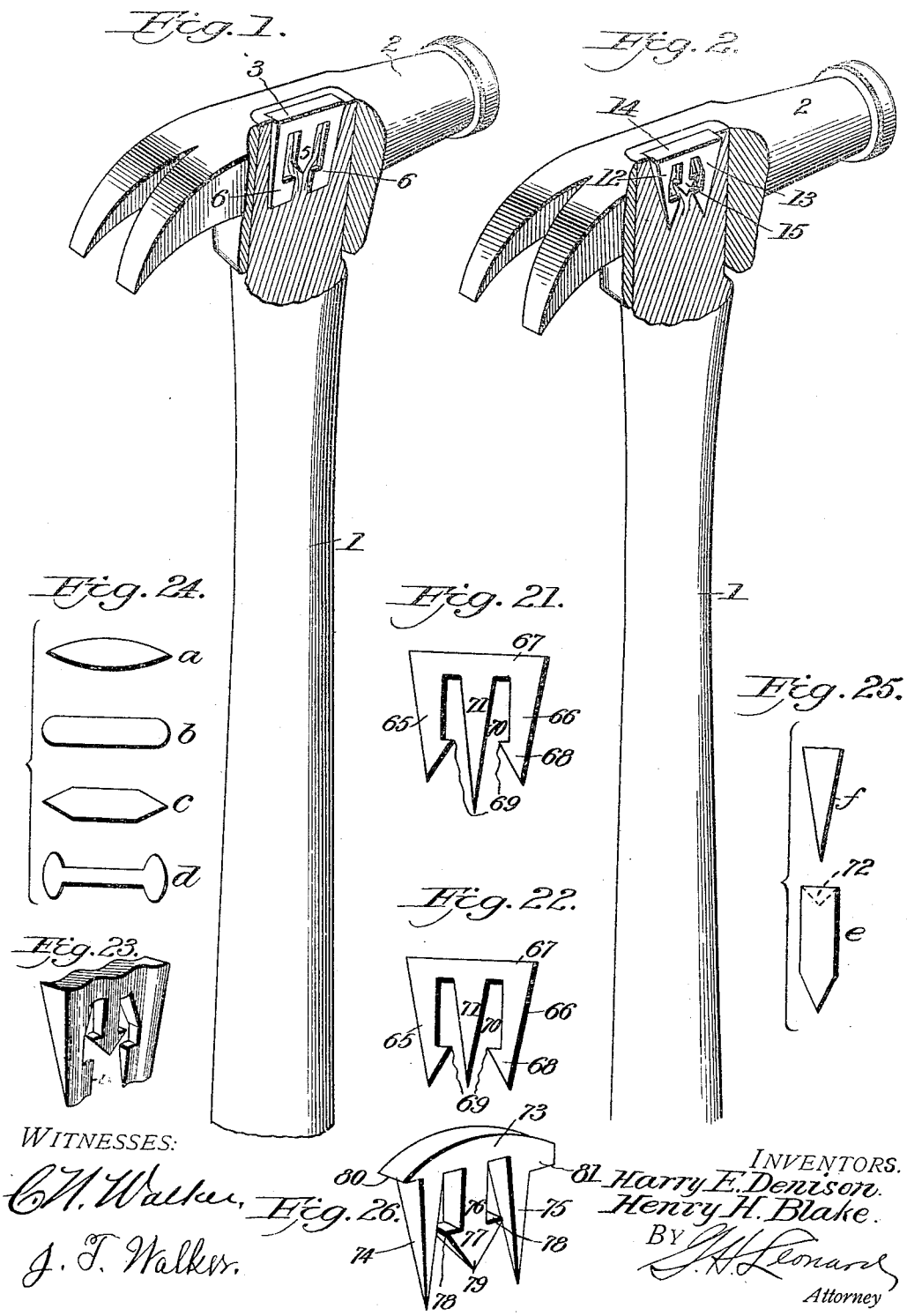

No. 824,415. PATENTED JUNE 26, 1906.
H. E. DENISON & H. H. BLAKE.
WEDGE.
APPLICATION FILED OCT. 3, 1904.

2 SHEETS—SHEET 2.

WITNESSES
C. H. Walker.
J. T. Walker.

INVENTORS.
Harry E. Denison
Henry H. Blake
BY
Leonard
Attorney

UNITED STATES PATENT OFFICE.

HARRY E. DENISON AND HENRY H. BLAKE, OF AUBURN, NEW YORK.

WEDGE.

No. 824,415.  Specification of Letters Patent.  Patented June 26, 1906.

Application filed October 3, 1904. Serial No. 227,054.

*To all whom it may concern:*

Be it known that we, HARRY E. DENISON and HENRY H. BLAKE, citizens of the United States, residing at Auburn, in the county of Cayuga, and State of New York, have invented new and useful Improvements in Wedges, of which the following is a specification.

This invention relates to wedges, and has for one of its objects to provide a self-anchoring wedge of simple, inexpensive, durable, and efficient character.

Another object of the invention resides in the provision of a wedge of such form or construction that it will successively wedge wood or like material solidly or tightly within surrounding surfaces, the device being particularly adapted to secure handles of tools in such manner as to obviate accidental separation of the handle from its socket.

Another object of the invention is to provide a peculiarly-shaped wedge designed to be driven into the end of a tool-handle under such peculiar wedging action as to force or to spread the fibers of the handle in different directions or planes, thereby insuring a positive fastening of the tool with respect to its handle.

While the invention is particularly applicable to the fastening of tool-handles, it is equally capable of use in all lines of manufacture wherein it is desirable to force the wood outwardly against surrounding surfaces and at the same time to firmly secure within the wood the wedge which performs this function, and therefore while the description herein refers particularly to the application of the invention to the class of articles to which it is especially applicable it is to be understood that we desire to cover in this one application various forms of wedges for use in any connection in which the same might be found useful.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a perspective view of a hammer, partly in section, illustrating the anchorage of one form of wedge in its working position as applied to a hammer. Fig. 2 is a similar view illustrating the anchorage of another form of wedge in its working position as applied to a hammer. Figs. 3 to 20, inclusive, illustrate various forms of wedges embodied in our invention. Figs. 21 and 22 are front elevations of wedges formed in accordance with our invention. Fig. 23 is a perspective view of a still further form of our improved wedge. Fig. 24 embraces top plan views $a$, $b$, and $c$, illustrating the manner in which the edges of any one or all of our improved wedges may be formed; and Fig. 25 embraces side or edge elevations $d$ and $e$, illustrating the manner in which one or all of the wedges may be formed with respect to the edges and also the extremities of the wedges. Fig. 26 is a detail perspective view of another embodiment of the invention designed particularly for the substitution of a railroad-spike. Fig. 27 is another embodiment of the invention.

Referring now to the accompanying drawings, and more particularly to Figs. 1 and 3, the reference characters 1 and 2 designate, respectively, a handle and hammer, it being understood, however, that while a hammer-tool is herein illustrated it is not intended to limit the field of use of the improved wedge to tools or devices of any particular character, for it is obvious that it is expedient to positively secure ax-heads, hatchet-heads, and other tool-heads to their handles, and, as premised in the foregoing, to fasten wood within surrounding material in other articles of manufacture and that the present invention is one capable of efficiently fulfilling such office in various articles. The wedge (illustrated in Fig. 1) consists of a head portion 3, having depending prongs 4, 5, and 6, the outer prongs being arranged at the ends of the head portion 3, and the intermediate prong 5 terminating short of the outer prongs, the outer edges of the outer prongs tapering slightly downwardly, as shown. The wedges in these two illustrations being alike in form, it will be observed that the lower ends of the outer prongs 4 and 6 are turned or otherwise directed inwardly toward each other at their lower ends, forming oppositely-disposed enlargements, offset portions, or projections 7, each having a shoulder or edge 8, designed to coöperate with the corresponding tapering or inclined edge 9 of the shorter or intermediate prong 5. By reason of this peculiar formation of the lower ends of the prongs the fiber of the wooden handle 1 or other article is spread as the wedge enters the same, the tapering or inclined portions of the intermediate prong coöperating with the shoulders or the like 8 of the aforesaid offset portions or projections of the outer prongs to spread the fibers of the wood upwardly and outwardly, and then by reason of the straight inner edges 10 and the outer edges 11 of the intermediate prong upwardly in substantially a vertical plane in the space between the intermediate and outer prongs, the said shoulders and the inclined or tapering portion of the intermediate prong bighting into or binding upon the fiber therebetween, securely retaining or anchoring the wedge against accidental displacement. In view of the taper upon the outer edge faces of the outer prongs the wooden fibers of the handle or the like and the surrounding inner surfaces of the bore or eye of the tool or other article are spread and wedged tightly therebetween, as clearly shown in the drawings.

Figure 14:
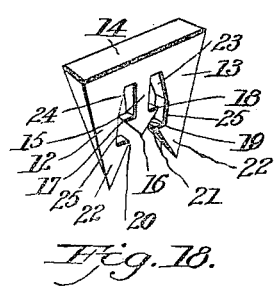

Referring now more particularly to Figs. 2 and 14, it will be observed that a somewhat-different form of wedge is presented. In the form of wedge hereinbefore described there is but a single binding action upon the wooden fibers of the handle; but in the form about to be described a double binding effect upon the wooden fibers is provided for—for instance, the outer prongs 12 and 13 are arranged at the ends of the head-piece 14 and are of greatest length than the intermediate prong 15. It will be observed that the intermediate prong is enlarged, as at 16, the said enlargement forming the projecting shoulders 17 and 18 and tapering downwardly into a sharp edge by reason of the converging or inclined edges 19, which latter coöperate with the corresponding shoulders 20 and 21 of the enlargements or offset portions 22 of the outer prongs, while the projecting shoulders 17 and 18 of the intermediate prong coöperate with the inclined inner edges 23 and 24 of the outer prongs. In the form first described the inner edges of the outer prongs are illustrated as being straight or parallel from the shoulders 8 to the head portion 3; but in the form being now described the inner edges of the outer prongs are straight throughout a portion of their length, as at 25, and inclined throughout the other portion thereof, as at 23 and 24, toward the intermediate prong. By reason of this double inclined and shoulder feature of this particular form of wedge the inclined faces 23 and 24 of the outer prongs coöperate with the offset projections or shoulders 17 and 18 above the coöperation of the offset projections, shoulders, or the like 20 and 21 with the inclined faces 19 of the enlargement 16 of the intermediate prong, thereby insuring a duplex or double gripping, binding, or bighting action of the wedge upon the wooden fibers, as clearly shown in Fig. 2 of the accompanying drawings.

Figure 4:
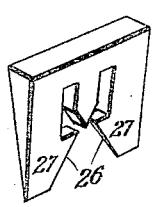
Figure 5:
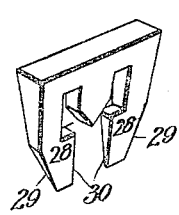
Figure 6:
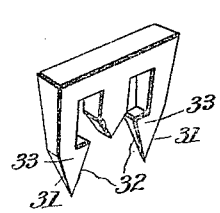

Figs. 4, 5, and 6 present views very similar in form to the construction of wedge illustrated in Figs. 1 and 3, the only difference residing in the formation of the lower ends of the outer prongs. For instance, in Fig. 4 the inner edges 26 of the enlargement 27 taper or incline toward the other edges of the outer prongs, whereas in Figs. 1 and 3 the corresponding edges of the enlargements of the outer prongs are substantially parallel with the outer edges of the prongs, as clearly shown in the drawings. In Fig. 5 the enlargements 28 of the outer prongs taper, as at 29, inwardly toward the substantially straight inner edges 30 thereof. In Fig. 6 both the inner and outer edges 31 and 32, respectively, of the enlargements 33 taper inwardly toward each other, meeting in an edge or point, as clearly illustrated.

Figure 7:
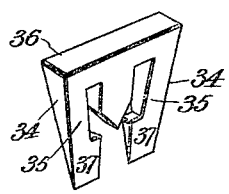

In Fig. 7 there will be seen a wedge very similar to the wedge illustrated in Figs. 1 and 3, the only difference residing in the fact that the outer edges 34 of the outer prongs 35 taper downwardly from the head portion 36 to the extreme lower ends of the enlargements 37, whereas in Figs. 1 and 3 the outer edges of the outer prongs 4 and 6 taper very little, if any.

Figure 8:
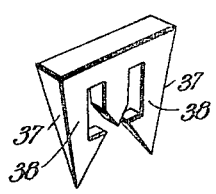
Figure 9:
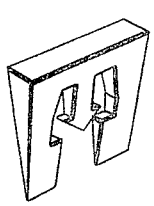
Figure 10:
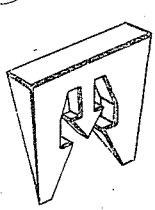
Figure 11:
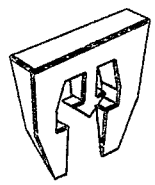
Figure 12:
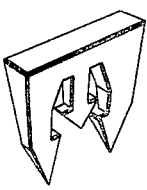
Figure 13:
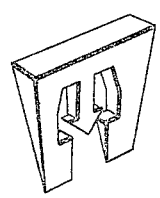

In Fig. 8 the illustration shows a form of wedge wherein great similarity is manifest therebetween and the wedge illustrated in Fig. 4, the only difference residing in the fact that the outer edges 37 of the prongs 38 of the wedge in Fig. 8 incline to a greater degree or extent than the outer edges of the outer prongs in Fig. 4, which latter incline very little, if any, being formed, preferably, on a substantially perpendicular line with respect to its inner edges.

In Figs. 9, 10, 11, 12, and 13 we have illustrated wedges very similar in form to the wedge shown in Figs. 2 and 14. In all these figures are illustrated forms wherein the double binding action upon the wooden fibers is obtained, the only material difference residing in the formation of the enlargements at the lower ends of the outer prongs to provide pointed or knife edges whereby the wedge may be driven easily home into its working position. In view of the description hereinbefore given of the other forms of wedges it seems unnecessary to enter more into detail with regard to the different features to which attention has just been called with reference to wedges illustrated in Figs. 9 to 13, inclusive.

Figure 15:
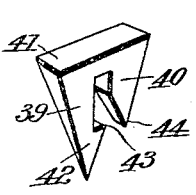
Figure 16:
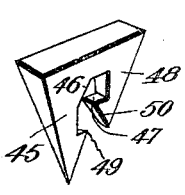
Figure 17:
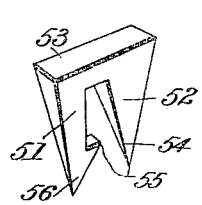
Figure 18:
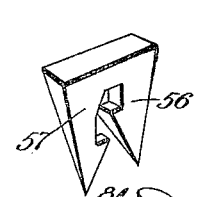
Figure 19:
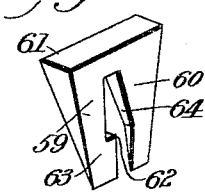
Figure 20:
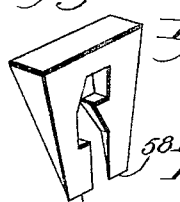

In Figs. 15 to 20, inclusive, it will be observed that the intermediate prong is not employed, and referring more particularly to Fig. 15 it will be seen that the prongs 39 and 40 depend from the outer ends of the head-piece 41, the prong 40 terminating short of the prong 39, the lower end of the latter being provided with an enlargement 42, having an offset shoulder 43 for coöperation with the inclined face 44 of the prong 40 to permit of the pinching, gripping, or binding action of the wooden fibers therebetween. In Fig. 16, the prong 45 is the same in form as the prong 39 in Fig. 15, with the exception that the prong 45 has its inner edge provided with an inclined portion 46, designed to coöperate with the shoulder 47 of the opposite prong 48 above the coöperation of the shoulder 49 with the inclined portion 50 of the prong 48. In Fig. 17 the prongs 51 and 52 depend from the head-piece 53 at the edges of the latter and are of the same length, the outer and inner edges of the prong 52 converging downwardly toward each other and resulting in a point or knife-edge, as shown, the inner tapering edge 54 of the prong 52 being so formed as to coöperate with the shoulder 55 of the enlarged portion 56 of the prong 51. In Fig. 18 there is illustrated a form of wedge very similar to the form of wedge shown in Fig. 16, the only difference residing in the fact that the outer prong 56 of the wedge in Fig. 18 is of the same length as its corresponding prong 57, the two prongs being formed in such a manner as to provide for the double gripping, pinching, binding, or like effect upon the wooden fibers of the handle or other article, as should now be clearly understood without further description. A description, in view of the foregoing, seems entirely unnecessary in connection with the form of wedge illustrated in Fig. 20, attention being called to the fact, however, that in this particular form of wedge the same result is obtained as in the form illustrated in Fig. 18 and that the lower extremities of the prongs in Fig. 20 are preferably in the form of a knife-edge 58, whereas in Fig. 18 the extremities of the prongs 56 and 57 are pointed. In Fig. 19 the prongs 59 and 60 are of the same length and depend from the outer ends of the head-piece 61, the shoulder 62 of the enlargement 63 coöperating with the inclined portion 64 of the wedge 60 to provide for the gripping or binding effect upon the wooden fibers.

In Figs. 21 and 22 there are illustrated forms of wedges very similar in construction. In both of these forms three prongs are employed. The outer prongs 65 and 66 are of the same length and depend from the ends of the head-piece 67, their lower ends being enlarged, as at 68, and provided with shoulders 69, designed to coöperate with the corresponding inclined edges 70 of the intermediate prong 71, for the purpose already explained. It will be readily observed that the only difference between the two wedges in Figs. 21 and 22 resides in the fact that the intermediate prong of the form shown in Fig. 21 extends beyond or beneath the termination of the outer prongs 65 and 66, while in Fig. 22 the intermediate prong 71 terminates in the same length as the outer prongs 65 and 66.

In Fig. 23 there is shown a somewhat-different form of wedge than any of the wedges hereinbefore described in that the wedge is provided with longitudinal corrugations, as shown. This form of wedge is otherwise very similar to the form of wedge illustrated in Fig. 9; but it is obvious that the other forms of wedges hereinbefore described may be corrugated in a manner similar to the form of wedge illustrated in Fig. 23.

The front and rear faces of any or all of the wedges may obviously be formed differently, as is shown in Fig. 24, wherein the view $a$ embraced in the said figure demonstrates that the wedge may have an oval shape, which is manifestly different from the shape clearly understood by reference to $b$ embraced in the same figure.

Fig. 25 embraces two views $e$ and $f$, illustrating views of any or all of the wedges from the edge, showing that the front and rear edges of each or all of the wedges may converge downwardly from the top to the lower end and that the front and rear edges, as shown in view $e$, may be substantially parallel throughout the greater portion of their length, converging at the lower portion.

Of course it is desired to always drive the wedge into a wooden handle or other article, so that the upper face of the head portion of the former will usually lie flush with the outer surface of the latter, and in some cases it may be well to form the upper face of the head of the wedge with a cavity or the like 72, as shown in the view $e$ of Fig. 25, into which may be fitted a nail-punch or the like for the purpose of assisting in locating the upper surface of the wedge, as stated, or to countersink the same, as well understood.

In Fig. 26 there is shown another embodiment of the present invention. In this particular form the wedge is well adapted to use in connection with railroad-rails, the wedge taking the place of the ordinary spike employed for securing rails upon ties. It is thought unnecessary to illustrate a rail or tie for the purpose of showing the application of the wedge in this connection, for it seems obvious that the application of the wedge in this connection will be fully understood by the description relating thereto. In this form the wedge is provided with a head portion 73, having the outer prongs 74 and 75 depending from near the ends of the head, there being an intermediate prong 76, having an enlarged arrow-shaped portion 77, resulting in the oppositely-disposed projecting shoulders 78 and the sharp point or edge 79. It will be seen that the inner and outer edges of the outer prongs are inclined and that they taper downwardly, the projecting shoulders 78 of the intermediate prong coöperating with the said inclined or tapering portions for the purpose explained in connection with the other forms of wedge. Of course in this form of wedge it is not the purpose to spread the wooden fibers of a handle against the inner walls of the bore or eye of a tool, but it is the purpose to anchor the wedge against accidental displacement with relation to its seat when driven into a tie. (Not shown.) It will therefore be understood that when this form of wedge is driven into a tie, the under surface 80 of the head 73 is designed to fit over the lower flange of the rail, (not shown,) the downwardly-projecting or enlarged portion 81 of the head 73 resting upon the upper surface of the tie.

In Fig. 27 will be found a form of wedge wherein the outer prongs 82 and 83 are of different formation than the prongs hereinbefore described and arranged with relation to the head-piece 84 in such manner as to extend beyond the front and rear faces thereof, both of said prongs tapering downwardly from all sides to a point 85. The intermediate prong 86 of this form of wedge has its lower end formed with an arrow-shaped enlargement 87, resulting in the oppositely-disposed shoulders 88, which coöperate with the corresponding inclined portions of the outer prongs, as shown.

It will thus be seen that in all forms of the wedges herein described the fiber of the wooden handle or other article is spread apart as the wedge enters the same and that the tapering or inclined portions of the different prongs tend not only to force the fiber of the wood inwardly and outwardly, but that some of the inclined or tapering portions coöperate with corresponding offset or projecting portions for creating a binding effect therebetween upon the wooden fibers, so as to anchor the wedge in position against accidental displacement, and while various forms of wedges have been illustrated in the accompanying drawings and described herein it should be understood that it is our intention to protect all these forms through the medium of broad or generic terms, the various forms being shown herein particularly that some of the various changes or modifications contemplated will be shown upon the face of the patent, it being understood, however, that still further modifications and changes may be resorted to within the spirit and scope of the invention.

What is claimed is—

1. A wedge, including a head portion, prongs associated therewith, one of the prongs provided with an enlargement having shoulders and inclined portions, and the other prongs each having a shoulder and an inclined portion for coöperation with the aforesaid shoulders and inclined portions.

2. A wedge, including a head portion, a prong arranged at each end of the head portion, and another prong associated with the head portion and arranged intermediate the end prongs and terminating short of the latter, the prongs being provided with shoulders and inclined portions, the shoulders and inclined portions coöperating with each other for creating a binding effect upon the material passed between them.

3. A wedge, including a head portion, prongs associated therewith, the intermediate prong terminating short of the outer prongs and provided with an enlargement having shoulders and inclined portions, the outer prongs having shoulders and inclined portions for coöperation with the inclined portions and shoulders of the intermediate prong.

4. A wedge, including a head portion and prongs associated therewith, the intermediate prong terminating short of the outer prongs and provided with an enlargement at its lower extremity, the enlargement having inclined portions and oppositely-disposed shoulders, the outer prongs each having a portion of its inner face inclined and its lower end provided with a shoulder, the shoulders of the outer prongs coöperating with the inclined portions of the enlargement of the intermediate prong and the shoulders of the latter coöperating with the inclined portions of the outer prongs.

5. A wedge, including a head portion and prongs associated therewith, the intermediate prong terminating short of the outer prongs and provided with an enlargement at its lower extremity, the enlargement having inclined portions and oppositely-disposed shoulders, the outer prongs each having a portion of its inner face inclined above the aforesaid shoulders, the lower ends of the outer prongs being provided with a shoulder arranged opposite the inclined portions of the said enlargement.

In testimony whereof we affix our signatures in presence of two subscribing witnesses.

HARRY E. DENISON.
HENRY H. BLAKE.

Witnesses:
DELIA D. CUYKENDALL,
GEORGE H. LEONARD.